Jan. 30, 1934.  E. B. MILLER  1,944,900
DAMPER VALVE
Original Filed Sept. 23, 1930   2 Sheets-Sheet 1
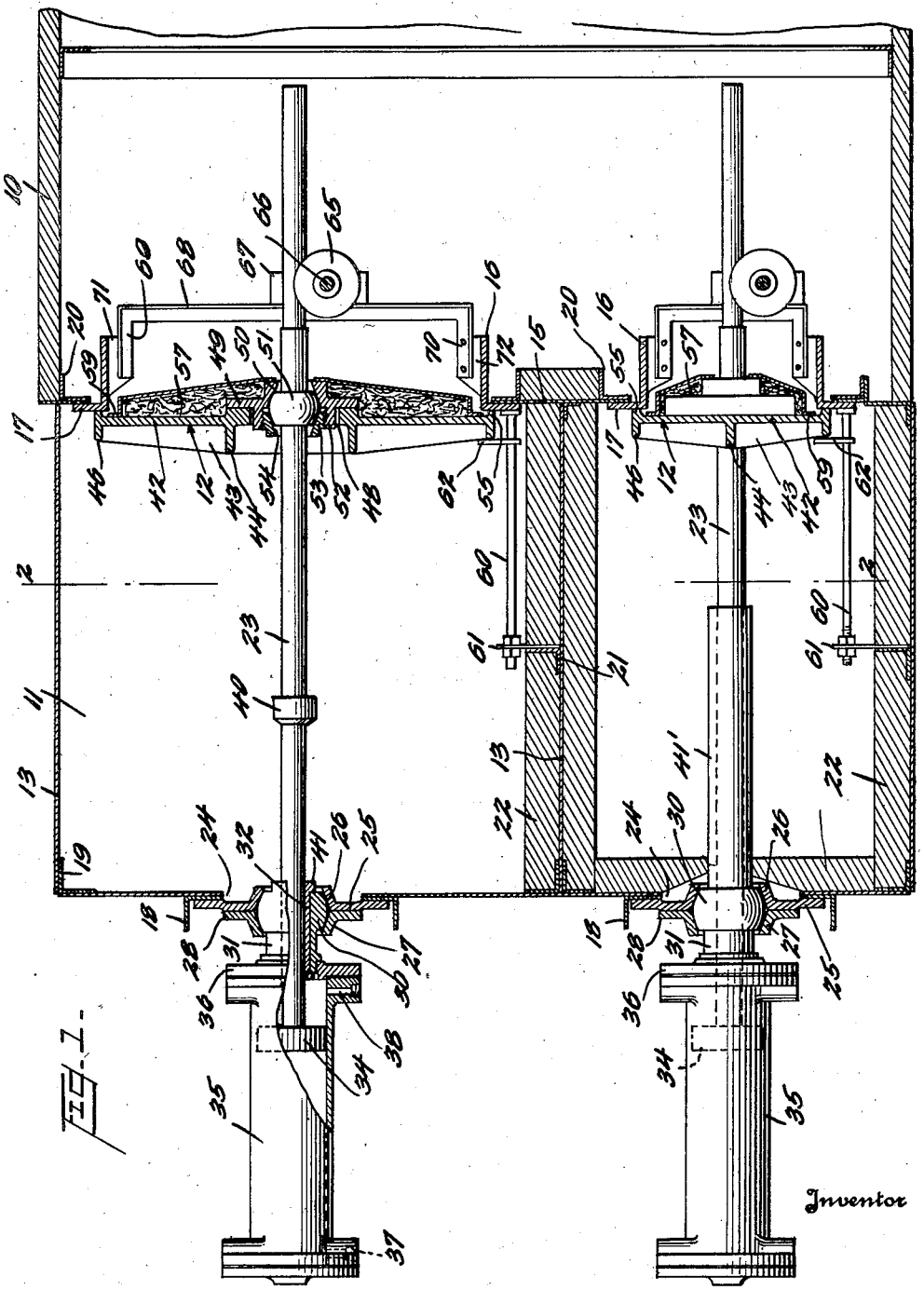
Inventor
Ernest B. Miller,
By Watson, Coit, Morse & Grindle
Attorneys Jan. 30, 1934.   E. B. MILLER   1,944,900
DAMPER VALVE
Original Filed Sept. 23, 1930   2 Sheets-Sheet 2
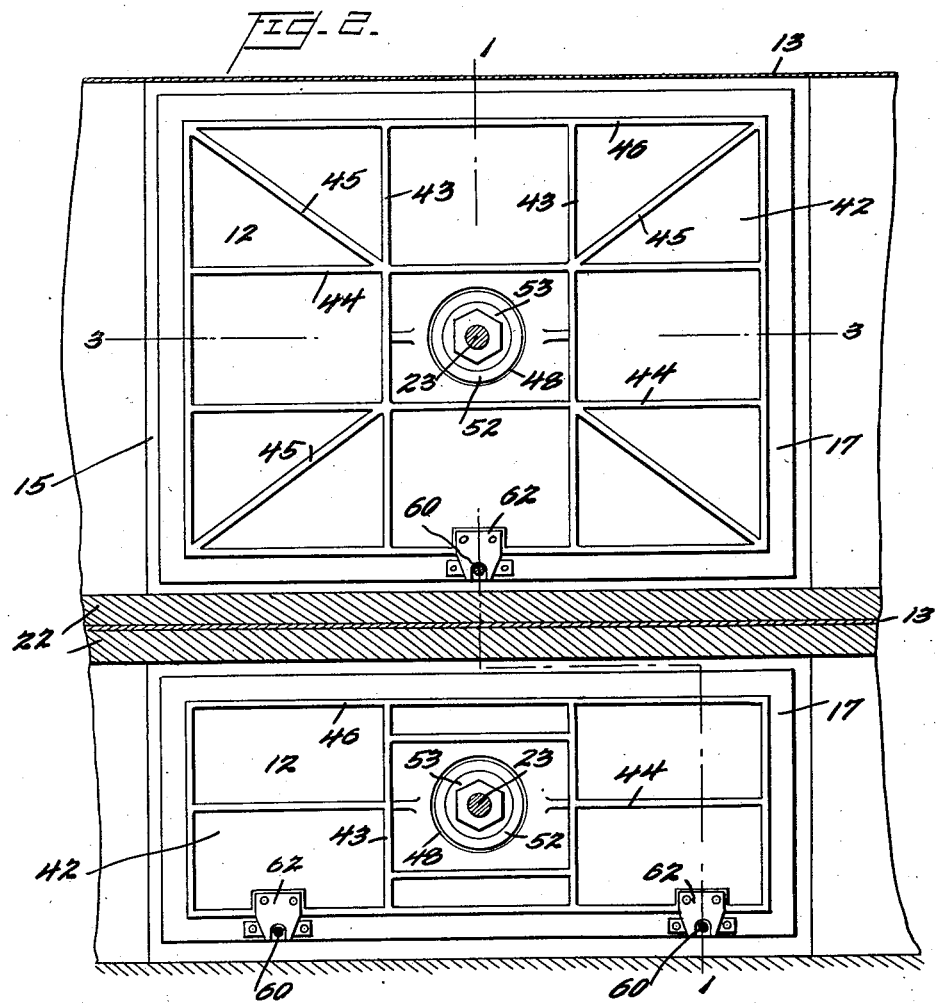
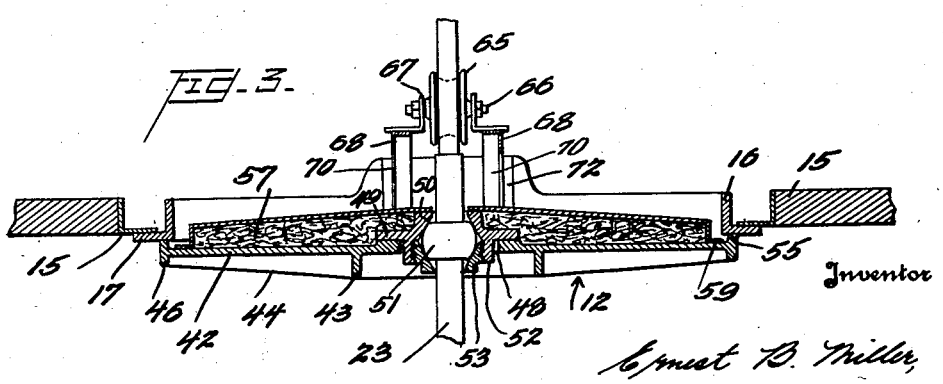

Patented Jan. 30, 1934

1,944,900

UNITED STATES PATENT OFFICE 1,944,900

DAMPER VALVE

Ernest B. Miller, Baltimore, Md., assignor, by mesne assignments, to Chester F. Hockley, receiver for The Silica Gel Corporation, Baltimore, Md., a corporation of Maryland Application September 23, 1930, Serial No. 483,847. Renewed April 19, 1933

11 Claims. (Cl. 137—139)

This invention relates to valves, and more particularly to large valves of the so-called damper type for use with gas and air.

It is a general object of the present invention to provide a novel and improved type of valve and operating mechanism therefor.

More particularly it is an object of the invention to provide a valve mechanism wherein both the valve disk and the operating device for the valve are universally mounted, whereby the valve stem and valve disk are self-aligning and seating.

Another feature of the invention resides in the construction of a large valve disk and in the arrangement of insulation material thereon for limiting the amount of heat transferred through the valve.

Still another feature of the invention resides in providing a valve disk within a valve chamber, a valve operating means outside of the chamber with a connecting stem passing through a wall of the chamber and universally mounted therein, with the bearing for the valve stem supporting the operating mechanism.

Other and further features and objects of the invention are illustrated and described in the accompanying drawings and following specification, wherein are disclosed two exemplary embodiments of the invention, with the understanding, however, that various changes may be made therein such as fall within the scope of the appended claims without departing from the spirit of the invention.

In said drawings,

Figure 1 is a vertical section through a pair of valves constructed according to the present invention mounted in position against the chamber to which they control the flow of gas, the section being taken on line 1—1 of Fig. 2;

Figure 2 is a transverse section taken on line 2—2 of Fig. 1 and showing the faces of the valve disks; and Figure 3 is a horizontal section taken on line 3—3 of Fig. 2.

In the control of large quantities of gases, such, for instance, as air, products of combustion, or the like, and particularly wherein these gases may vary in temperature between wide limits, special attention must be paid to the types of valves for controlling the flow. The present invention is disclosed particularly in connection with the control of air and gaseous products of combustion to and from adsorbers of the type often used for removing moisture from atmosphere or wet constituents from gases. In these devices the gas velocities are extremely high, the volumes of gases handled are often tremendous, and the temperatures may range from 10° Fahrenheit to more than 700° Fahrenheit, and the valves are often subject alternately to these temperatures. With such severe conditions of operation, special attention must be paid to the construction of the valve disk, to means for insuring accurate seating of the valve and to the power mechanism for operating the valve, in order that slight changes in size and shape due to expansion, contraction and warpage will not interfere with the operation of the valve.

In describing the invention resort is had to a form of valve and associated parts such as used, for instance, with systems for drying atmospheric air of the type disclosed in my copending application Serial No. 425,883, filed February 4, 1930, for Adsorption system.

Referring now to the drawings, there is shown at 10 an adsorber casing in the form of a large air-tight chamber enclosed with insulated walls and provided with one or more layers of an adsorbent material through which gas or air must pass to move from one side to the other of the casing. At the side of the casing shown, two valves are arranged for the admission and/or discharge of air or activating gases. These two valves are generally similar but are somewhat varied in size and arranement, owing to the different temperatures under which they must operate. The upper valve is assumed to control the flow of air, while the lower valve controls the flow of heated products of combustion for activation.

Each valve includes a housing 11 wherein the valve disk 12 operates. Each housing is separated from the adsorber casing 10 by a vertical wall 15 but is connected thereto through the medium of a nozzle 16 which takes the form of a short tube extending through the wall 15 into the casing 10 and of a transverse cross section similar to that of the desired valve disk shape. This nozzle is provided with an integral radial flange 17 fitting on the inner side of the wall 15 and forming the valve seat proper.

The top and bottom walls of the valve casings 11 are preferably formed of metal sheets 13 and the corners and other places necessary are reinforced by suitable structural elements such as the angles 18, 19, 20 and 21.

Each valve may be used individually, in which case one of the side walls of the chamber is closed and the other opened to a suitable inlet or induction conduit, but in the apparatus disclosed in the aforementioned application, a number of valves are arranged side by side so that their chambers, being connected together, form longitudinal air ducts or trunks with each valve opening into a separate adsorber, whereby a selective control of the adsorbers is possible. The upper valve in the drawings being for air at substantially atmospheric temperature, has the walls of its chamber formed of sheet metal only, whereas the lower valve being for high temperature gas, has the inner walls of the chamber carefully insulated by means of the slabs 22 of insulating material, which reduce heat radiation to the atmosphere and to the adjacent ducts.

Passing centrally and axially through the nozzle of each valve is a valve stem 23 which also passes through the wall of the casing opposite the nozzle. This wall is provided with a large opening 24 for this purpose, and secured to partially close this opening is the collar 25 having the partially conical flange 26 which cooperates with the corresponding flange 27 on the smaller ring 28 secured to the ring 25 to form a bearing for the ball 30 which is provided with the tubular extension 31. Fitting within the ball and the extension is the bushing or sleeve 32 having a close fit to and forming a bearing for the valve stem 23, which by means of the ball and flange arrangement is universally mounted for self-alignment in the housing wall.

The outer end of the valve stem 23 is provided with a suitable piston 34 fitting in a cylinder 35 closed at the front end by a flange 36 which is mounted on and securely fastened to the extension 31 of the ball whereby the whole cylinder is supported from the bearing for the ball 30. In any position the piston is sufficiently far from the bearing 26, 27, 30 to serve to support the cylinder in the position shown. This permits the cylinder to be self-aligning in respect to the rod, which is in effect its piston rod. Suitable inlets 37 and 38 permit compressed fluid, such as air, to enter one or the other of the ends of the cylinder to move the piston, and hence the valve stem for operating the valve.

In the construction shown in the upper valve, a stop collar 40 is provided on the stem to engage the flange 41 on the bearing sleeve 32 and limit the outer movement of the piston, but in the form shown in the lower valve the flange 41 is elongated into a tube 41' which is engaged by a portion of the valve proper, to be later described, which limits the motion of the piston in the cylinder.

Where compressed air is used as the operating medium and where there is no possibility of the cylinder becoming heated, cup washers may be provided on the piston, but in the lower valve where high temperatures are conducted to the piston through the valve stem, packing rings such as used in steam engines must be resorted to.

The valve closure member, or disk, as it will be referred to hereafter, is of such size as to overlap the valve seat 17 and close the opening therein. In order that it may withstand the high temperatures and sudden changes in temperature, it is preferably formed of cast metal, such, for instance, as cast iron, to the form of a thin flat plate 42. It has on its inner or chamber face a plurality of reinforcing ribs 43 extending vertically, 44 extending horizontally, and if desired, additional ribs 45 extending diagonally, as seen in the upper part of Fig. 2. The lower valve of smaller vertical height is provided with less reinforcing means, as clearly seen in the lower part of Fig. 2. At the edges the valve disk is reinforced by the peripheral flange 46.

Each valve disk is provided with a large central aperture 48 over which is secured a plate 49 having a conical flange 50 similar to that numbered 26 for supporting the ball member of the bearing for the valve stem. This flange 50 receives the ball 51 rigidly secured to the valve stem 23. The plate 49 is provided with a cylindrical flange 52 extending through the aperture 48 and internally threaded to receive the sleeve 53 having the conical interior bore 54 which engages on the valve stem ball 51 which is thus loosely clamped between the parts 50 and 53 to universally mount the valve on the stem in order that it may move to accommodate itself accurately to the seat. The valve may have, owing to its size and construction, sufficient flexibility so that the pressure applied by the operating means is sufficient to insure its close fit, all around its periphery, to the seat. The tightness of fit is assisted by the seating flange 55 on the face of the valve which engages the seat.

In order that heat may not be transferred from the interior of the casing 10 to the valve chamber or vice versa, when the valve is closed, the inner face of the valve is covered with suitable insulating material 57 held in position by a sheet metal cover secured to the valve face. The exterior of this cover is in the form of a very flat pyramid, and the center of it bea , on the flange 50, while a peripheral flange 59 bears against the face of the valve disk just within the seating flange 55. There is sufficient clearance at the valve stem to permit an adequate amount of movement of the valve disk on the stem.

To prevent rotation of the valve disk either on the stem or as a result of movement of rotation of the stem, a guide rod 60 is suitably supported from a bracket 61 and the wall 15 parallel to the valve stem and below the lower edge of the valve disk, and is straddled by a notched follower 62 secured to the inner face of the valve as shown in Figs. 1 and 2.

The moment of the valve disk about the ball 30 is greater than the moment of the operating cylinder 35, so that the natural tendency would be for the valve to fall and incline its end of the stem downwardly. To prevent such occurrence, the end of the stem which projects into the adsorber casing 10 rests in the groove in a roller 65 journalled on a shaft 66 mounted in brackets 67. Each of these brackets is carried by a substantially vertical angle member 68 attached at the top and bottom to shorter angle members 69 and 70 respectively secured to the walls of upper and lower extensions 71 and 72 of the nozzle 16, as best seen in Fig. 3. The end of the valve stem may be reduced in diameter where it runs on the roller, since it is not subject to a great amount of strain at this part, for there is some counterbalancing effort between the valve disk and the operating cylinder.

With the construction shown and described, the valve is free to operate properly irrespective of warping, for instance, of the valve stem or associated parts due to temperature changes, for the valve will always be self-seating and the valve stem will always be properly aligned with the axis of the operating cylinder so that no binding will result. It has been found in actual practice that this form of valve and operating mechanism has given satisfactory results over long periods of usage without the necessity of shutting down the apparatus for fixing stuck or jammed valves and stems. It will be obvious that instead of the fluid expansion cylinder for operating the valve, that other similar devices can be used.

In any case, however, it is preferred to have the operating means universally mounted by means of the ball which carries the bearing sleeve for the valve stem.

It will be appreciated that the expression "valve disk" is not to be interpreted as necessarily meaning a circular valve member, but is intended to cover any shape valve member such as falls within the scope of the appended claims. The word "disk" is merely used as a convenient expression of a large substantially flat member.

Having thus described the invention, what is claimed as new and desired to be secured by Letters Patent is:

1. In a power operated valve mechanism, in combination, a valve stem, a valve disk universally mounted on said stem, power means having a substantially stationary part universally mounted for alignment with the stem, and a movable part rigid with said stem.

2. In a power operated valve mechanism, in combination, a valve stem, a valve disk universally mounted on said stem, power means having a substantially stationary part universally mounted for alignment with the stem, a movable part rigid with said stem, and means to guide said stem to maintain said disk in register with the valve seat.

3. In a valve mechanism, in combination, a valve chamber having an opening and valve seat therein, a valve disk for cooperation with said seat, a valve stem passing through said disk, said opening and the wall of the chamber opposite said opening, a self-aligning bearing for said stem in said wall, operating means for said stem mounted on said bearing and guide means for said rod near said opening.

4. In a valve mechanism, in combination, a valve chamber having a port and surrounding valve seat therein, a valve stem passing through said port and the chamber wall opposite the port, a valve disk within said chamber and on said stem, for cooperation with said seat, a self-aligning bearing in said wall for said stem, a piston on said stem outside of said wall, a cylinder cooperating with said piston and mounted on said bearing, and a guide for the opposite end of said rod.

5. In a valve mechanism, in combination, a valve chamber having a port and surrounding valve seat therein, a valve stem passing through said port and the chamber wall opposite the port, a valve disk within said chamber and on said stem, for cooperation with said seat, a self-aligning bearing in said wall for said stem, a piston on said stem outside of said wall, a cylinder cooperating with said piston and mounted on said bearing, and guide means to prevent rotation of said disk.

6. In a valve mechanism, in combination, a valve chamber having a port in a vertical wall thereof with a seat surrounding said port, a substantially horizontal valve stem passing through said port and the chamber wall opposite said port, a valve disk within the chamber for cooperation with said seat, means mounting the disk on said stem for self-adjustment to the plane of the seat, a bearing for said stem universally mounted in said wall, operating means for said stem supported by said bearing outside of said chamber, the moment arm of the valve disk about said bearing being greater for all positions of the valve than the moment arm of the operating means, and a roller to support the valve stem outside of the port.

7. In a valve mechanism for an adsorber, in combination, a valve chamber of fabricated sheet metal and structural parts adapted to be secured to the adsorber casing, a nozzle connecting the chamber and casing and providing a valve seat, a valve stem passing through said nozzle and the wall of the chamber opposite thereto, a self-aligning bearing for said stem in said wall, a guide for said stem carried by said nozzle outside of the chamber, and a damper disk on said stem between said bearing and guide.

8. In a valve mechanism, in combination, a valve chamber having a port in a vertical wall thereof with a seat surrounding said port, a substantially horizontal valve stem passing through said port and the chamber wall opposite said port, a valve disc within the chamber for cooperation with said seat, means mounting the disk on said stem for self-adjustment to the plane of the seat, a bearing for said stem universally mounted in said wall, operating means for said stem supported by said bearing outside of said chamber, the moment arm of the valve disk about said bearing being greater for all positions of the valve than the moment arm of the operating means, a roller to support the valve stem outside of the port, and means to prevent rotation of said disk.

9. In a valve mechanism for an adsorber, in combination, a valve chamber of fabricated sheet metal and structural parts adapted to be secured to the adsorber casing, a nozzle connecting the chamber and casing and providing a valve seat, a valve stem passing through said nozzle and the wall of the chamber opposite thereto, a self-aligning bearing for said stem in said wall, a guide for said stem carried by said nozzle outside of the chamber, a damper disk on said stem between said bearing and guide, a guide in said chamber, and means on said disk to cooperate with said guide to prevent rotation of the disk.

10. In a valve subject to alternate heating and cooling, the combination of a valve chamber, a nozzle in one wall of the chamber forming a port and surrounding valve seat, a valve stem passing through the nozzle and the opposite wall of the chamber, a bearing for said stem, a universal mounting for said bearing secured to said opposite wall, a piston on the stem outside of said casing, a cylinder cooperating with said piston and supported by said bearing, a valve disk mounted on said stem for universal tilting in respect thereto, and a non-binding guide for said stem carried by said nozzle.

11. In a valve subject to alternate heating and cooling, the combination of a valve chamber, a nozzle in one wall of the chamber forming a port and surrounding valve seat, a valve stem passing through the nozzle and the opposite wall of the chamber, a bearing for said stem, a universal mounting for said bearing secured to said opposite wall, operating means for said stem outside of said casing and partially supported by the stem, a valve disk on said stem for cooperation with said seat and a stem guide carried by said nozzle.

ERNEST B. MILLER.